United States Patent [19]

Stamboulian et al.

[11] 4,394,993

[45] Jul. 26, 1983

[54] RESILIENTLY MOUNTED SPLIT PAWL LOCKING MEANS FOR DUAL SPOOL RETRACTOR

[75] Inventors: Nazareth Stamboulian, Los Angeles, Calif.; Fred F. Neumann, Rochester, Mich.

[73] Assignee: American Safety Equipment Corporation, San Fernando, Calif.

[21] Appl. No.: 293,117

[22] Filed: Aug. 17, 1981

[51] Int. Cl.³ .................................... B65H 75/48
[52] U.S. Cl. .................. 242/107.4 A; 242/107.4 B; 242/107.4 R; 280/806; 297/478
[58] Field of Search ............... 242/107.4 B, 107.4 A, 242/107.4 R; 280/806; 297/478

[56] References Cited

U.S. PATENT DOCUMENTS

| | | |
|---|---|---|
| 987,272 | 3/1911 | Valiquet . |
| 2,495,990 | 6/1948 | Sockell . |
| 2,930,540 | 3/1960 | Obolensky . |
| 2,953,315 | 9/1960 | Lautier et al. ............... 297/478 |
| 3,220,668 | 11/1965 | Martin . |
| 3,241,883 | 3/1966 | Fontaine ............... 242/107.4 R |
| 3,259,331 | 7/1966 | Liddle . |
| 3,822,840 | 7/1974 | Stephenson ............ 242/107.4 B |
| 3,871,600 | 3/1975 | Linblad ............... 242/107.4 B |
| 3,960,339 | 6/1976 | Fisher ............... 242/107.4 R |
| 3,974,979 | 8/1976 | Fieni . |
| 4,040,576 | 8/1977 | Walker et al. . |
| 4,065,070 | 12/1977 | Pilarski et al. . |
| 4,127,181 | 11/1978 | Arndt et al. . |
| 4,135,683 | 1/1979 | Stephenson et al. . |
| 4,147,307 | 4/1979 | Coenan . |
| 4,164,336 | 8/1979 | Higbee et al. . |

Primary Examiner—Stuart Levy
Assistant Examiner—Lloyd D. Doigan
Attorney, Agent, or Firm—Poms, Smith, Lande & Rose

[57] ABSTRACT

An emergency locking dual spool safety belt retractor having a frame, two belt storage spools rotatably mounted in said frame, a spool locking ratchet on each spool and an inertia sensor for sensing vehicle acceleration or deceleration above a predetermined value is provided with a split pawl locking means for locking the two belt storage spools in response to operation of the inertia sensor wherein resilient means are provided, including a pawl guide positioning the pawl members and cushioning them between the spool ratchets and resilient bushings surrounding ends of the pawl members and guide which penetrate the retractor frame side walls, whereby lockup of both spools by the two separate pawl members is assured even in a false latching condition and when one or the other pawl member engages a ratchet in a tooth to tooth condition, the resiliency of the resilient guide and bushings cooperating to maintain the pawl members in spool locking condition in response to operation of the inertia sensor.

10 Claims, 14 Drawing Figures

RESILIENTLY MOUNTED SPLIT PAWL LOCKING MEANS FOR DUAL SPOOL RETRACTOR

BACKGROUND OF THE INVENTION

The present invention relates to locking means for locking spools of a dual spool safety belt retractor employed in association with safety belts and harnesses employed for restraining passengers in seats of moving vehicles. More particularly, the present invention relates to a pawl locking means interposed between two spools of a dual spool retractor in operative locking relation to ratchet wheels provided on the spools to lock the spools against protractive rotation in response to actuation by a single inertia sensor and, more specifically, to an improved construction for the pawl means and the means for mounting such pawl means to the retractor.

Dual spool automatic emergency locking safety belt retractors have been developed heretofore for use in automotive vehicles to automatically lock a pair of safety belts wound about the dual spools in an emergency condition encountered by the vehicle. In some instances the retractor is mounted between the vehicle seats with the seat belts serving two separate safety belt systems for the two front seat passengers of the vehicle. In other situations, the dual spool retractor may be used for storing ends of two safety belt webbing portions employed in a single safety belt harness employed for restraining a single passenger in his vehicle seat in the case of an emergency condition. It is common to sense such emergency conditions through the use of a vehicle inertia sensor, generally of the pendulum type, which reacts in response to vehicle acceleration or deceleration of more than a predetermined amount to activate the locking means employed for locking the spools of the retractor against further belt protractive rotation. It has also been common to use a unitary pawl disposed between the two spools with the sensor moving the pawl into engagement with at least one of the spool ratchet locking means and the rotation of such first spool causing the unitary pawl member to be shifted or moved into locking engagement with the other spool ratchet means.

Prior art examples of dual spool automatic locking retractors which employ a single locking pawl means between two spools of a dual spool emergency locking retractor are found in U.S. Pat. Nos. 3,960,339; 3,974,979; 4,065,070; 4,135,683; and 4,164,336. In these prior art patents, a single pawl is provided between two spools of the retractor with the lockup of one end of the pawl with one spool causing the pawl to be moved into locking engagement with the other spool. The single pawls employed have been provided with a "floating" support as in U.S. Pat. No. 4,135,683 or a resilient mounting by end bushings as in U.S. Pat. No. 3,960,339 in order to improve the locking characteristics of the single pawl employed between the two spools.

It is been recognized that where a single double ended pawl is employed, as in the aforementioned prior art patents, there is the possibility that the pawl may experience a false latching condition if the pawl tooth ends, of either end, engage the tip of a tooth on the associated spool locking ratchet normally employed in locking the spools. These patents have disclosed means for mounting the unitary, double ended pawl in a floating or resilient mounting in order to improve the locking characteristics of the pawl during such false latching conditions. One such means is the addition of a program pawl and ratchet formed of resilient material which is engaged by motion of the inertia sensor and causes engagement of a spool locking pawl and ratchet in a predetermined or programmed manner. We have determined that there is room for improvement in the locking characteristics of an emergency locking means for such dual spool retractors employing a single inertia sensor and single pawl means and therefore, as a primary object of the present invention, desire to disclose and provide such an improvement in the locking characteristics of such double ended pawl means for dual spool retractors.

SUMMARY OF THE INVENTION

It is the primary object of the present invention to disclose and provide an improved emergency locking means for a dual spool safety belt retractor wherein the lockup characteristics of the locking means are improved in such a manner as to reduce the possibility of a false locking between the pawl and ratchet means of the safety belt retractor.

It is another object of the present invention to disclose and provide an improvement as in the foregoing object wherein a rebound condition occurring at one end of a double ended pawl is not transmitted through the pawl to the opposite end and does not prevent the pawl means from maintaining its spool lockup condition once an emergency locking condition has been experienced and the associated inertia sensor has acted.

It is a still further object of the present invention to disclose and provide an improvement in emergency locking means for a dual spool retractor as in the foregoing objects and particularly to disclose and provide an improved resilient mounting means operable in association with a unitary acting double ended pawl which will maintain the pawl ends in spool locking engagement even when a tip-to-tip condition is experienced by one or the other pawl end with a tooth of the associated spool ratchet means.

It is still another object of the present invention to disclose and provide an improvement in locking means as in the foregoing objects and particularly to disclose and provide an improved programming pawl and ratchet operable in association with a double ended pawl to maintain a positive locking bias on said double ended pawl in a predetermined manner in order to prevent false locking.

Generally stated, the present invention comprises the provision of split pawl means for locking the two belt storage spools of the emergency locking type dual spool safety belt retractor wherein the pawl means includes two separate pawl members and a resilient means for mounting the pawl members to each other to normally act as an unitary double ended pawl, but in the event of a tooth to tooth engagement of either pawl end, the pawl ends act somewhat independently of one another by virtue of the resilient means provided therebetween so that the pawl end which correctly locks up stays locked up and the pawl which is experiencing a false locking condition is urged by the resilient means toward a locking condition. More specifically, the present invention includes the provision of a resilient pawl guide made of a preferably plastic resilient material which extends along and engages inner marginal edges of two spaced generally rectangular configured pawl members with ends of the pawl members and guide mounted in the retractor side walls for pivotal movement of the pawl members into and out of locking engagement with ratchets of the two spools. In addition, the invention contemplates the cooperation therewith of resilient bushings, known per se in the art, for additionally resiliently mounting the subassembly of pawl members and pawl guide to the retractor side walls whereby the individual pawls, normally acting as a unit, are separated by resilient material from each other and from the retractor frame in which they are pivoted. The invention further contemplates the provision of pawl programming means including at least a program ratchet on one of the two spools and a program pawl connected to the pawl member associated with the first spool for programming lockup between the pawl member and the ratchet of the first spool.

It is submitted that a better understanding of the present invention in locking means for a dual spool safety belt retractor will become apparent to those skilled in the art, as well as a recognition of additional advantages and objects of the invention, will be afforded to those skilled in the art from a consideration of the following detailed description of a preferred exemplary embodiment thereof. Reference will be made to the appended sheets of drawings which will first be described briefly.

DETAILED DESCRIPTION OF AN EXEMPLARY EMBODIMENT

Figure 1:
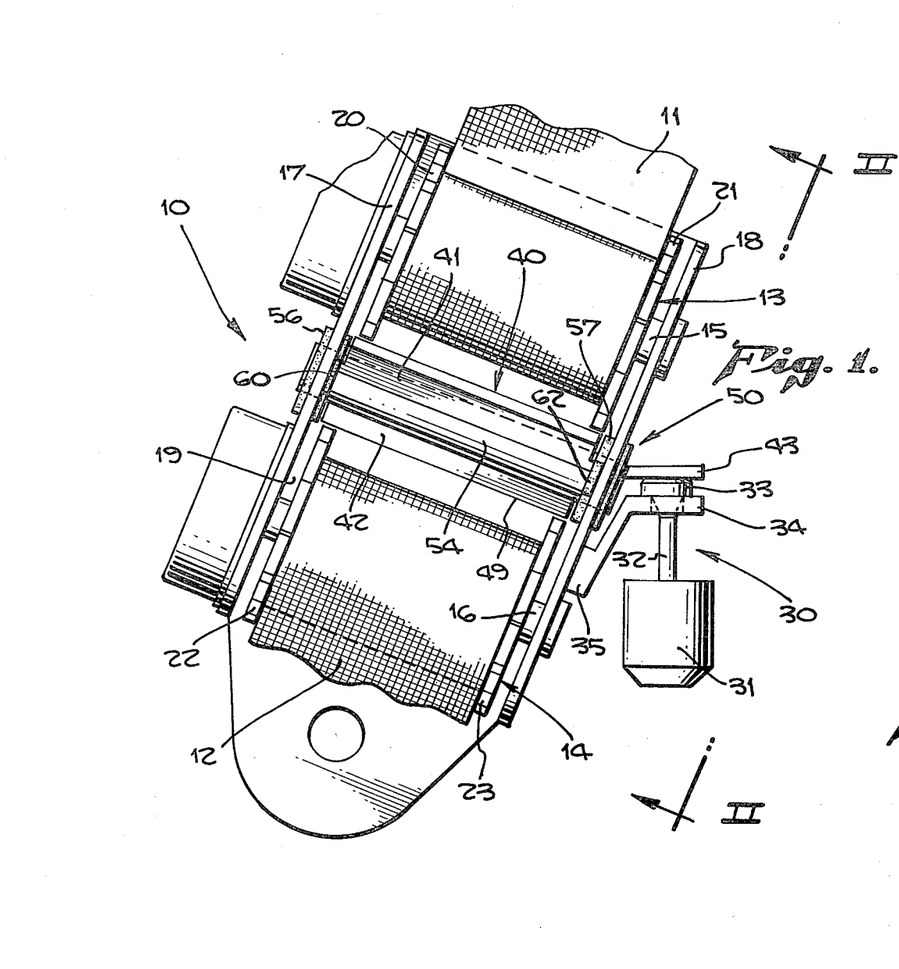
FIG. 1 is a front elevational view of an exemplary dual spool safety belt retractor of the emergency locking type employing an exemplary embodiment of the improvement in split pawl means for locking the two belt storage spools of the retractor in accordance with the present invention.
Figure 2:
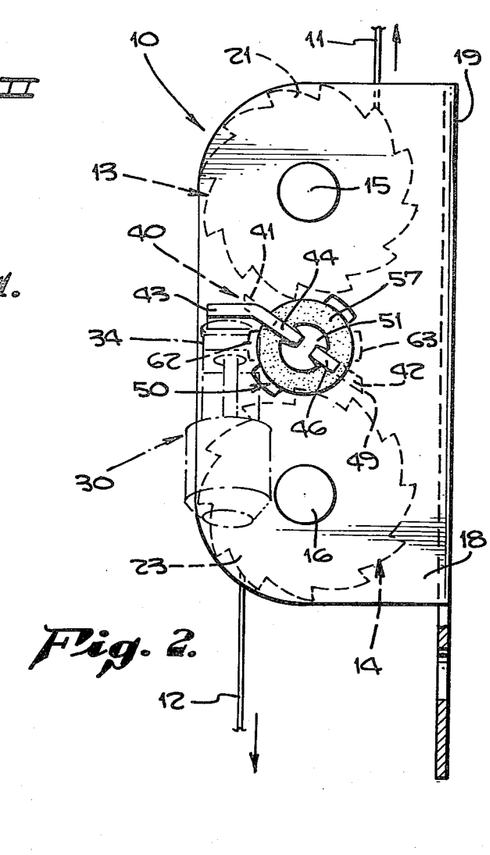
FIG. 2 is a side view of the apparatus of FIG. 1 taken therein along the plane II—II showing the exemplary split pawl means in spool unlocking condition.

Referring initially to FIG. 1, an exemplary emergency locking dual spool safety belt retractor, indicated generally at 10, is illustrated as the environment in which the present improvement in a split pawl locking means is provided for locking the two belt storage spools of the retractor. As is conventional in safety belt retractor constructions presently, the exemplary embodiment of retractor, indicated generally at 10, mounts safety belts 11 and 12 on two belt storage spools, indicated generally at 13 and 14, the spools each being mounted by spool shafts 15 and 16 to the side walls 17 and 18 of a generally U-shaped retractor frame having base 19. Each of the spools is provided with ratchet means in customary manner, as ratchets 20 and 21 on spool 13 and ratchets 22 and 23 on spool 14. Conventional rewind springs are provided in the housings illustrated on the left hand side of the retractor frame in FIG. 1 for normally biasing the two spools to wind the associated safety belts 11 and 12 onto the spools.

Dual spool retractors as illustrated in FIG. 1 may be employed for storing and locking seat belts for two occupants of an automotive vehicle, such as when the retractor is mounted between bucket seats of an automobile. It is also known to employ such dual spool retractors for winding and storing ends of two belt portions of a single safety belt harness employed for a single occupant on a vehicle seat. In either event, it is desired to lock the dual spools in response to an emergency condition experienced by the vehicle, such as when the vehicle encounters a sudden deceleration or acceleration condition as in a vehicle crash. As it is also known in the art heretofore, such vehicle emergency condition can be sensed by a vehicle inertia sensor such as the inertia sensor indicated generally at 30 in FIG. 1.

The exemplary vehicle inertia sensor, indicated generally at 30, includes a pendulum mass 31 mounted by stem 32 depending from head 33 pivotally supported by apertured arm 34 extending outwardly from bracket base 35. The stem 32 passes through the aperture indicated in the bracket arm 34 with the sensor head or actuator 33 underlying cam arm 43 to operate the pawl locking means as discussed hereinafter.

As particularly contemplated within the present invention, the locking means for locking the two spools indicated generally at 13 and 14 of the exemplary safety belt retractor comprises a split pawl means for locking the two belt storage spools in response to operation of the single sensor, indicated generally at 30, in a manner to assure reliable and effective lock up of both spools even where there may be a tendency for a tip-to-tip condition to occur between either one of the associated pawl members and the teeth of a ratchet wheel it is locking.

Figure 5:
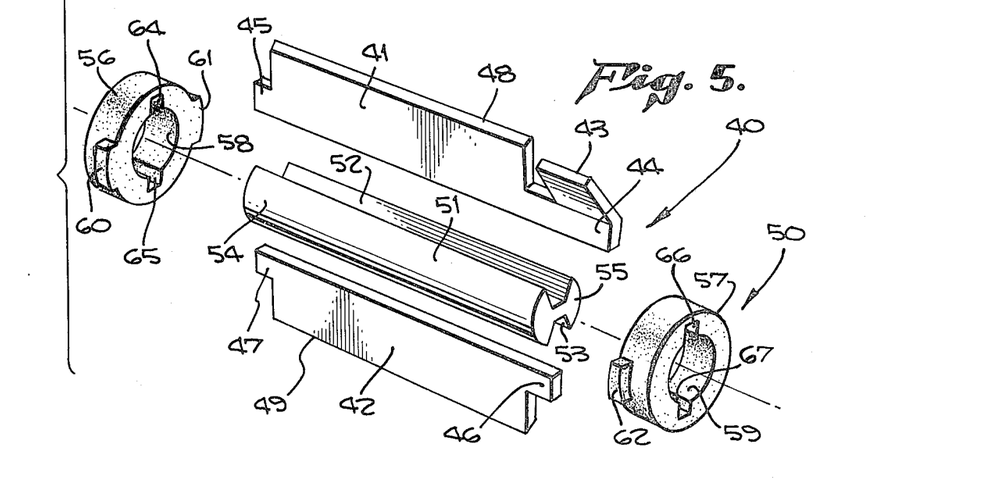
FIG. 5 is an exploded view of the exemplary embodiment of split pawl means of FIGS. 1 through 4.

An exemplary embodiment of split pawl means for locking the two belt storage spools, in accordance with the present invention, is indicated generally at 40 and, as best seen in FIG. 5, includes separate pawl members 41 and 42. Each of the pawls members 41 and 42 is of a generally rectangular configuration with the upper pawl 41 having cam arm 43 formed integrally of pawl ear 44. Each of the pawl members 41 and 42 is provided with laterally projecting pawl ears, as ears 44 and 45 on pawl 41 and ears 46 and 47 on pawl 42. As will become more apparent subsequently, the pawl ears penetrate the retractor frame side walls where the pawl members are mounted to the retractor frame. Pawl 41 has a laterally extending pawl tooth 48 along its upper edge which is adapted to engage and lock against teeth of the upper spool ratchets 20 and 21. Likewise, the lower pawl 42 is provided with pawl tooth 49 which is adapted to engage and lock against mating teeth of the lower spool ratchets 22 and 23.

As is particularly contemplated within the present invention, the split pawl means including pawl members 41 and 42 are mounted by resilient means to the retractor frame and to each other operably located between the spools and spool ratchets with resilient material thereof being interposed between the pawl members and between the pawl members and the portions of the retractor frame where the pawl members penetrate the frame side walls. In the exemplary embodiment, and as best seen in FIG. 5, such resilient means are indicated generally at 50 and may include pawl guide 51 when it is formed of a resilient plastic material such as that sold under the trade name HYTREL. Alternatively, pawl guide 51 may be formed of steel, aluminum or other rigid materials. Pawl guide 51 preferably comprises a longitudinally extending member of a length comparable to the lateral extent of the two pawl members 41 and 42, as seen in FIG. 5, with pawl mounting slots 52 and 53 which extend for the full length of guide 51. These slots are preferably provided so that pawl members 41 and 42 fit snugly into the guide to facilitate mounting of the members in operative relationship between the spools and, alternatively, can be molded to the laterally extending marginal edge portions of the pawl members 41 and 42 which face the longitudinally extending guide member. Opposite end portions, as portions 54 and 55 of guide 51 preferably penetrate the retractor frame side walls 17 and 18, as end 55 is shown penetrating wall 18 in the detail view of FIG. 4. The guide ends and pawl ears cooperate with resilient bushings discussed hereinafter for mounting the pawl members 41 and 42 to the retractor frame in accordance with the present invention.

Figures 3, 4:
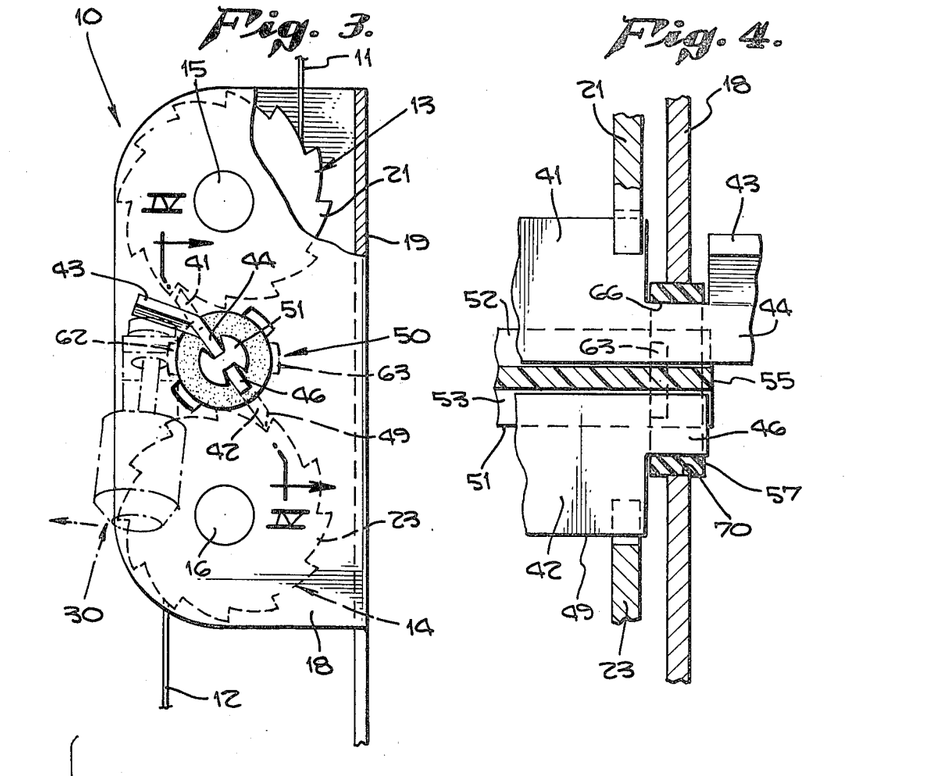
FIG. 3 is a view as in FIG. 2 showing the split pawl means in the spool locking condition.
FIG. 4 is a detail view, partially in section, of the preferred exemplary embodiment of split pawl means shown in FIGS. 1 through 3.

The resilient means of the exemplary embodiment, indicated generally 50, includes the provision of resilient bushings 56 and 57, as best seen in FIG. 5, which have axial bores 58 and 59, respectively, which fit over, or about, guide ends 54 and 55 respectively, as bushing 57 fits over guide end 55 in the detail view of FIG. 4. Each of the exemplary bushings is further provided with cutouts or slots to accommodate the pawl ears of pawl members 41 and 42. As best seen in FIG. 5, bushing 56 is provided with cutouts 64 and 65 to fit about pawl ears 45 and 47 respectively. Resilient bushing 57 has a through slot 66 to accommodate the pawl ear 44 which passes thereby to mount cam arm 43 over the head 33 of the exemplary inertia sensor indicated generally at 30. Bushing 57 also has a lower cutout, similar to cutout 65 on bushing 56, to fit about lower pawl ear 46.

The pawl members 41 and 42 may be assembled or molded to pawl guide 51 as a subassembly and as such be assembled between the spools with the pawl ears and guide ends located through the larger sized apertures, as aperture 70 in side wall 18 as seen in FIG. 4, in the retractor frame. With the split pawl and guide subassembly so positioned between the retractor side walls, with the pawl members 41 and 42 located between the dual spool ratchets, the resilient bushings 56 and 57 may then be pressed from the outer sides of the retractor side walls through the side wall openings into engagement with the pawl member and guide ends, including pawl member ears 44 through 47 and guide ends 54 and 55 to the assembled relationship as seen in FIG. 1. The resilient means for mounting the pawl members thus described in the preferred exemplary embodiment thereby mounts the pawl members in operative position between the spools and ratchets with resilient material thereof interposed both between the pawl members themselves and between the pawl members and the frame of the retractor. Through the provision of such resilient means both between the pawl members and the retractor frame, and between the two pawl members themselves, the assurance of the lockup of both pawl members in response to an emergency condition sensed by the inertia sensor 30 is assured.

By way of example, in the event of an emergency condition, it is anticipated that inertia sensor mass 31 will react to the acceleration or deceleration condition experienced by the vehicle and move cam arm 43 and pawl 41, integral therewith, into engagement with ratchets 20 and 21 of the upper spool indicated generally at 13. Such movement of the upper pawl will be transmitted through the guide 51 to the lower pawl member 42 to bring its pawl tooth 49 into engagement with teeth of the lower spool ratchets 22 and 23. In the event of a tooth to tooth contact between pawl tooth 49 and teeth of the lower spool ratchets, the lower pawl 42 may tend to bounce or rebound in the face of such a tooth to tooth contact against the guide member 51. The resiliency of bushings 56 and 57 will tend to maintain pawl 42 in its operative position and return it to an operative position if the rebound force is sufficient to deflect pawl 42 compressing bushings 56 and 57 temporarily.

ALTERNATIVE EXEMPLARY EMBODIMENT

The present invention particularly contemplates adaptation of the above-described split pawl means for use in combination with other means for preventing false locking such as programming means. Together, the combination of split pawl means and programming means accomplish lockup of both spools of a dual spool retractor with increased reliability by effectively eliminating false locking.

Referring to FIGS. 6-14, the alternative exemplary embodiment utilizes a dual spool retractor structure similar to that shown in FIGS. 1-5, the retractor being indicated generally at 10, with the same parts of the retractor illustrated in FIGS. 6-14 having the same reference numerals as the retractor parts heretofore described with regard to FIGS. 1-5.

Figures 13, 14:
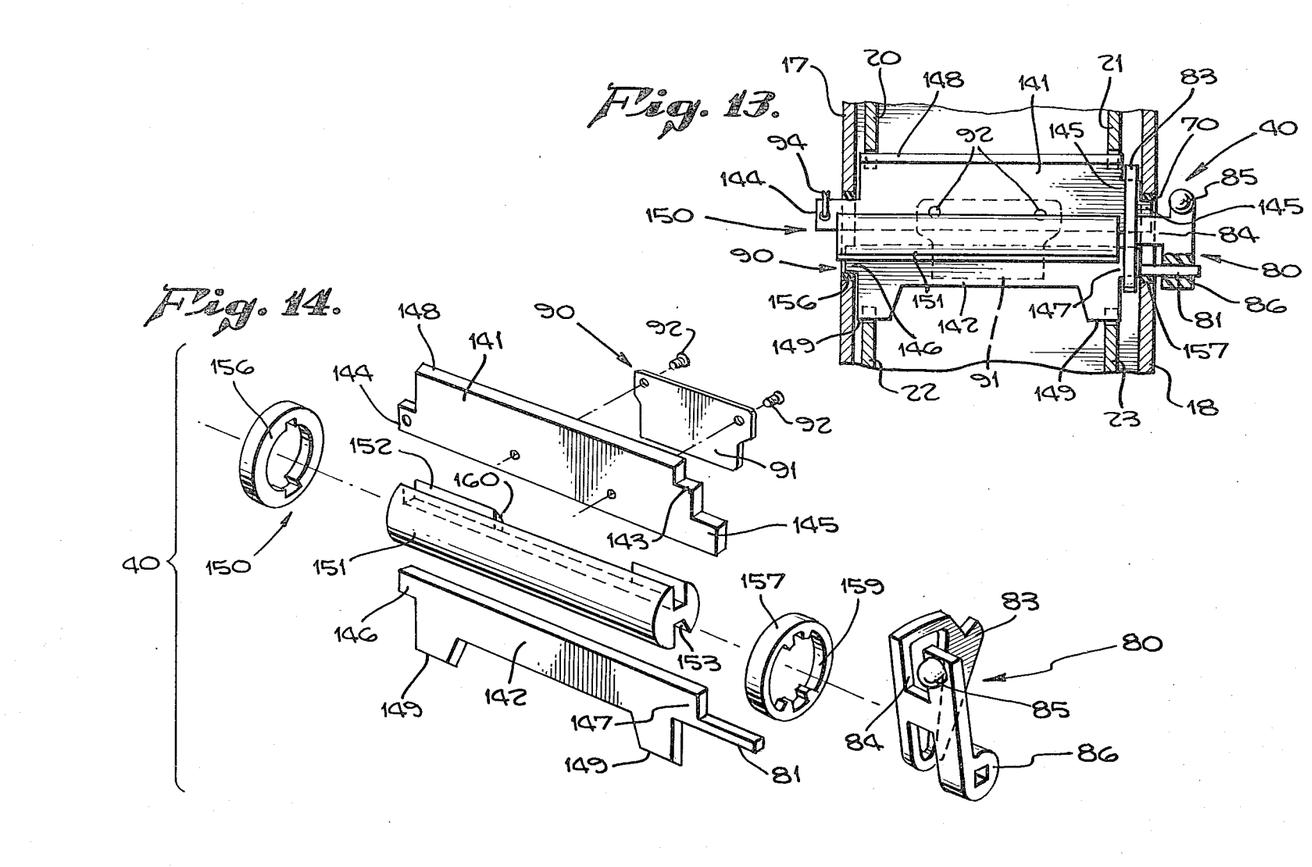
FIG. 13 is a detail view, partially in section, of the alternative exemplary embodiment of split pawl means shown in FIGS. 6 through 8 and 10 through 12.
FIG. 14 is an exploded parts view of the split pawl means of FIG. 13.

In this alternative exemplary embodiment of split pawl means 40 for locking the two belt storage spools 13 and 14, separate pawl members 141 and 142 are provided as before. The upper pawl 141 has a generally laterally extending rectangular configuration with laterally projecting pawl ears 144 and 145. As will become more apparent subsequently, the right hand pawl ear of pawl member 141, as shown in FIG. 14, has a programming arm cutout 143 for cooperation with programming means 80 which will be later described. Pawl 141 has a laterally extending pawl tooth 148 along its upper edge which is adapted to engage and lock against the teeth of the upper spool ratchets 20 and 21. Similarly, the lower pawl member 142 is provided with laterally projecting pawl ears 146 and 147. As will also become more apparent subsequently, the right hand pawl ear 147, as shown in FIG. 14, has a laterally projecting post 81 for cooperation with programming means which will be later described. Pawl 142 has laterally extending pawl teeth 149 which are adapted to engage and lock against mating teeth of the lower spool ratchets 22 and 23.

As in the first exemplary embodiment of the present invention, the split pawl means including pawl members 141 and 142 are mounted by mounting means 150. In the alternative embodiment, the biasing of pawl members 141 and 142 is accomplished by the provision of resilient biasing means 90. More specifically, mounting means 150 includes, as best seen in FIG. 14, pawl guide 151, again formed of aluminum or a rigid plastic material. Pawl guide 151 comprises a longitudinally extending member of a length comparable to the lateral extent of the two pawl members 141 and 142 with pawl mounting slots 152 and 153 which extend for the full length of the pawl guide 151. In this alternative embodiment, the upper pawl slot 152 is configured to snugly fit onto its respective upper pawl member 141 such that the pawl guide 151 and the upper pawl member 141 tend to move in a unitary manner. The lower pawl mounting slot 153 is provided with non-parallel opposing slot walls such that the lower pawl member 142 tends to pivot within the lower pawl mounting slot 153 relative to the pawl guide 151. Together, the upper and lower pawl members 141 and 142 are rotatably mounted to the frame by bushings 156 and 157, preferably formed of a rigid plastic such as Delrin.

Figure 7:
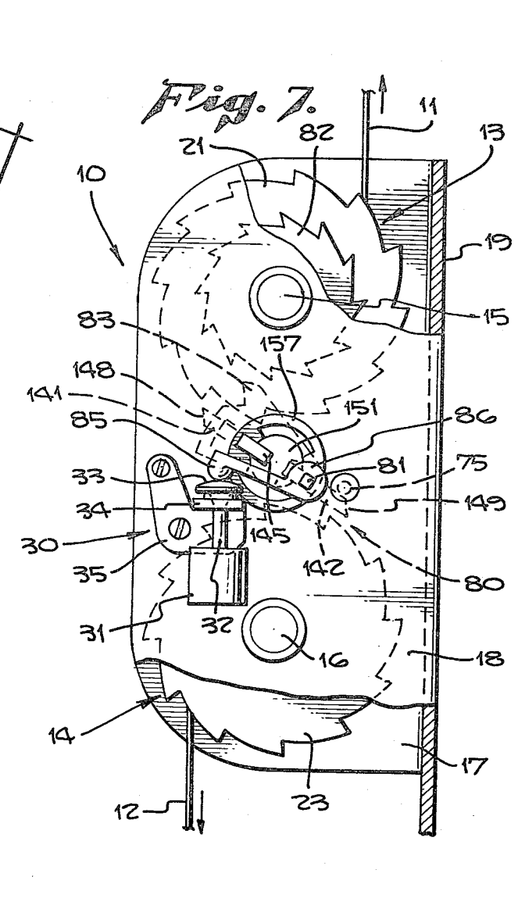
FIG. 7 is a side view of the apparatus of FIG. 6 taken therein along plane VI—VI showing the exemplary split pawl means in spool unlocking condition.
Figure 9:
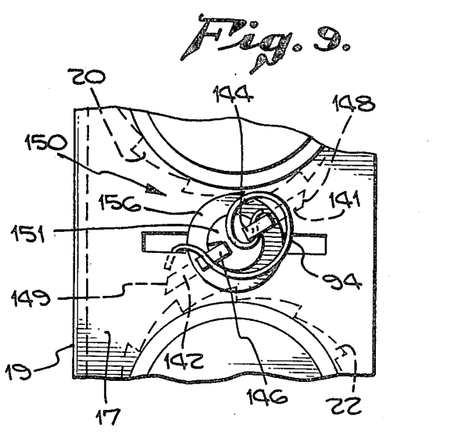
FIG. 9 is a side elevation of the apparatus of FIG. 6 taken in section along line IX—IX of FIG. 6.

A coil spring 94, as particularly shown in FIG. 9, is provided for biasing the assembled split pawl means toward the ratchet disengaged position defined by counterclockwise rotation as seen in FIG. 7 against pawl stop 75. This bias may be overcome by a predetermined moment experienced by inertia sensor 30 as in a vehicle crash. This assembly is an alternative to the rotational biasing imparted by resilient bushings 56 and 57 of the first exemplary embodiment.

Additionally, pawl guide 151 is further provided with a cutout section 160 such that a laterally extending planar member may be positioned centrally with respect to the longitudinal aspect of the pawl guide 151 and may simultaneously contact and be mounted to the planar surface formed by one side of the two pawl members 141 and 142. In this embodiment, biasing means 90 is comprised of a planar biasing spring 91 which is rigidly fastened to upper pawl member 141 by fastening means 92, extends through the cutout section 160 of pawl guide 151, and contacts the respective planar surface of lower pawl member 142 such that the lower pawl member 142 is biased to pivot within lower pawl mounting slot 153 of pawl guide 151 in a ratchet engaging direction.

Figure 8:
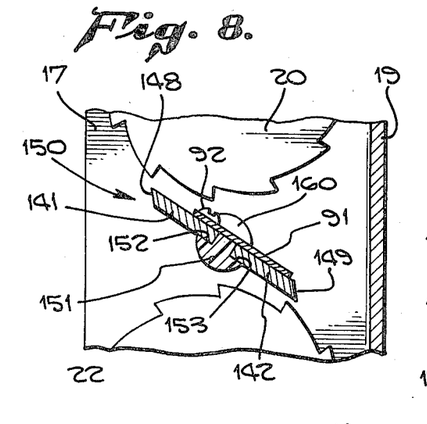
FIG. 8 is a side elevation of the apparatus of FIG. 6 taken in section along the plane VIII—VIII and showing the exemplary split pawl means in a spool unlocking condition.
Figure 11:
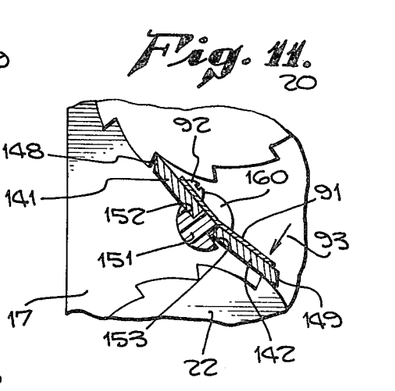
FIG. 11 is a side elevation similar to FIG. 8 showing a part of the split pawl means in a false locking condition.
Figure 12:
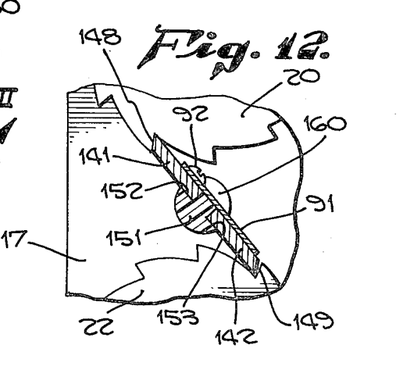
FIG. 12 is a side elevation similar to FIG. 8 showing the split pawl means in a spool locking condition.

FIG. 8 particularly shows the upper and lower pawl members 141 and 142 arranged in their normal planar orientation as defined by the pawl mounting slots 152 and 153. FIG. 11 shows the lower pawl member 142 pivoted within pawl mounting slot 153 by tip-to-tip contact with the ratchet teeth of the second spool 14. Planar biasing spring 91 biases lower pawl member 142 in the direction of arrow 93 such that upon further rotation of second spool 14, the lower pawl member 142 engages the ratchet teeth of the second spool 14, as shown in FIG. 12. It is contemplated within the present invention that other configurations of biasing means may be used to enhance the biasing of lower pawl member 142, including use of a resilient pawl guide and in combination with the resilient bushings of the first embodiment.

Figure 6:
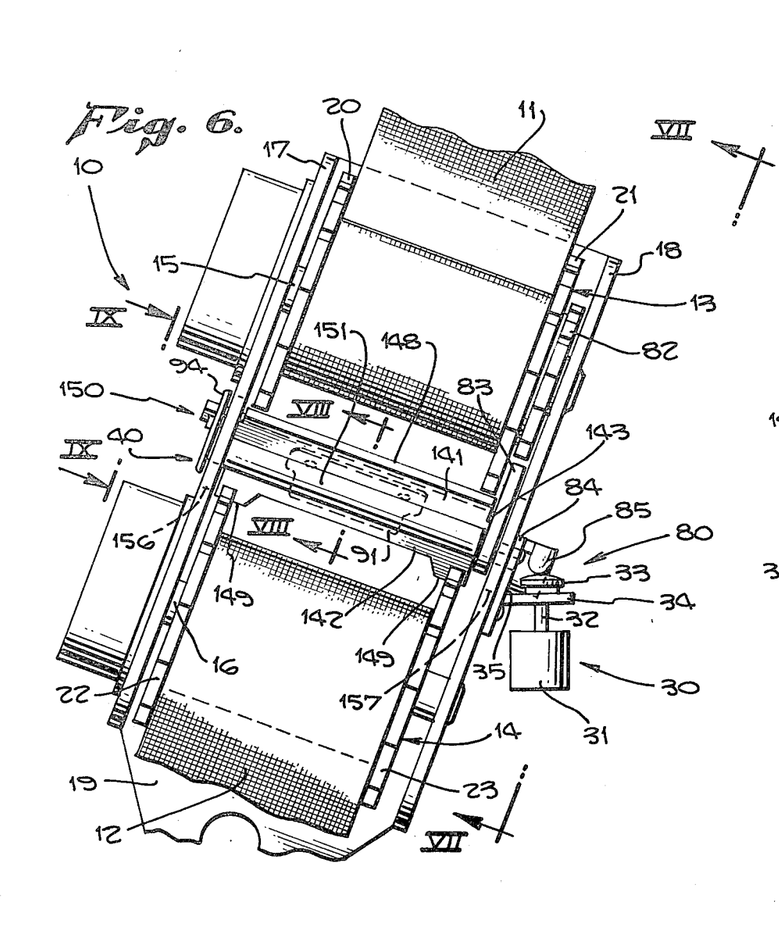
FIG. 6 is a front elevational view of an exemplary dual spool safety belt retractor of the emergency locking type employing an alternative exemplary embodiment of the improvement in split pawl means for locking the two belt storage spools of the retractor and including programming means in accordance with the present invention.
Figure 10:
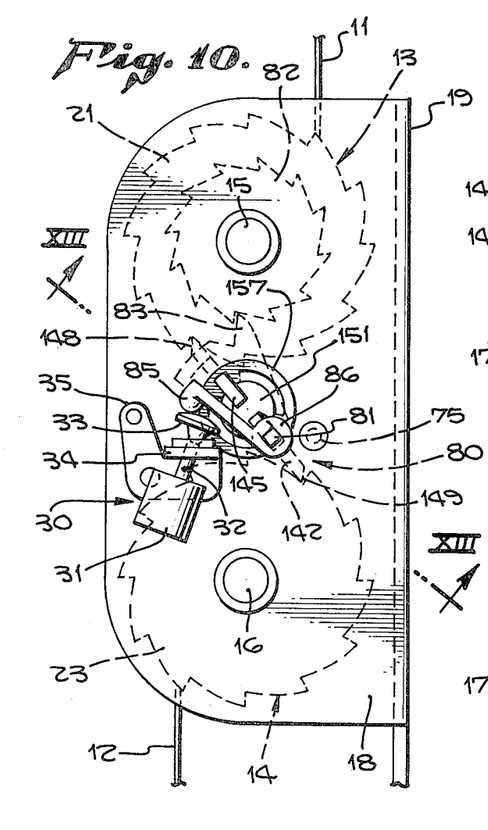
FIG. 10 is a side view similar to FIG. 7 showing the split pawl means in the spool locking condition.

The alternative exemplary embodiment further includes programming means, indicated generally at 80 in FIGS. 6, 7, and 10, for causing pawl member 141 to engage ratchets 20 and 21 of first spool 13 in a lockup assured manner. In the alternative embodiment, programming means 80 includes the provision of a programming ratchet 82, programming pawl 83, and resilient connecting means 84. Resilient connecting means 84 includes arm 85 overlying the head 33 of the pivotally supported pendulum mass 31 of inertia sensor 30 as particularly shown in FIG. 7. Resilient connecting means 84 further includes sleeve 86 for mounting the resilient connector means 84 about square post 81 of lower pawl member 142. Programming pawl 83 is an integral extension of resilient connecting means 84 and disposed so that it may engage programming ratchet 82 when the resilient connecting means 84 is rotated by inertia sensor 30. Programming ratchet 82 is positioned adjacent to and may be integral with ratchet 21 of first spool 13.

The mounting means 150 of the alternative embodiment further includes the provision of bushings 156 and 157 as best seen in FIG. 14. The cutouts and slots for bushings 156 and 157 are generally similar to the cutouts and slots previously described with respect to bushing 56 and shown in FIG. 5. By the addition of coil spring 94, the bushings may have a simplified construction, as shown in FIG. 14, and may bias one pawl member relative to the other without regard to their rotational orientation if formed or resilient material. Alternatively, in conjunction with coil spring 94 and biasing means 90, the bushings need not be formed of resilient material and still come within the scope of the present invention.

Assembly of this alternative embodiment is also similar to the previously described assembly with the provision that the resilient connecting means 84 of programming means 80 as best seen in FIG. 14 is configured such that during assembly it may be fitted through the axial bore 159 of the right hand bushing 157 and through the aperture 70 of the sidewall 18 of the retractor frame prior to insertion of the pawl members 141 and 142 and the pawl guide 151.

In operation, tilting of the inertia sensor 30 during an emergency condition causes head 33 of inertia sensor 30 to lift the overlying arm portion 85 of resilient connecting means 84 thereby rotating programming pawl 83 about post 81 into engagement with programming rachet 82. It is not necessary that programming pawl 83 and programming rachet 82 have the structural strength or rigidity to lockup spool 13. Rather, it is intended that the combined programming pawl 83 resilient connecting means 84 and arm portion 85 be fabricated of a low mass material such that it may be highly responsive to the vehicle inertia sensor 30.

Resilient connecting means 84 is further provided with a cutout 87 through which the ear 144 of upper pawl member 141 proximate the programming arm cutout 143 extends. Rotation of the resilient connecting means 84 such that programming pawl 83 is in engagement with programming ratchet 82 causes the resilient connecting means 84 to bias pawl member 141 into engagement with ratchets 20 and 21 on spool 13. In this configuration it is pawl members 141 and 142 and rachet wheels 20, 21, 22, and 23 that are intended to be formed of materials that may structurally withstand the forces encountered during the emergency lockup condition.

As may be particularly observed in FIGS. 7 and 10, engagement of programming pawl 83 with programming ratchet 82 and further rotation of spool 13 associated with belt protraction causes resilient connecting means 84 to be rotated such that the assembly comprising the combined pawl members 141 and 142 and pawl guide 151 is rotated about the axis of pawl guide 151 in response to the biasing of resilient connecting means 84 on square post 81, eccentric to the axis of rotation of pawl guide 151. In this manner, further protraction of the seat belt from spool 13 causes rotational biasing of lower pawl member 142 into engagement with spool 14 and translational biasing of upper pawl member 141 into engagement with spool 13. In this manner, the programming means 80 will overcome any tendencies for the upper pawl means 141 to experience a false locking condition with respective spool 13 and, due to the biasing provided by spring 91 and lower pawl member 142 will overcome any tendencies to experience a false locking condition with respective spool 14.

The foregoing detailed description of alternative exemplary embodiments of split pawl means and resilient means for mounting relative the retractor frame and spool ratchets achieves the objects and advantages stated hereinbefore and it is believed that persons skilled in the safety belt buckle retractor art will appreciate the same and recognize that various modifications, adaptations and alternative embodiments thereof may be made within the scope of the present invention which is described by the following claims.

We claim:

1. In an emergency locking dual spool safety belt retractor having a frame, two belt storage spools rotatably mounted in said frame, a spool locking ratchet on each spool, inertia sensor means and pawl means operated by said sensor means to engage each said ratchet to lock said spools against further belt protraction, the improvement in pawl means comprising the provision of:
    split pawl means for locking said two belt storage spools and including two separate pawl members; and
    resilient means for mounting said pawl members to said frame and to each other operably located between said spools and ratchets to normally act as a unitary double ended pawl with resilient material thereof being interposed between said pawl members and between said members and said frame whereby in the event either one of said members engages a tooth of one of said ratchets in a tip-to-tip condition, said resilient means will be compressed between said members and said one member will be resiliently urged into engagement with a next tooth of said one of said ratchets.

2. The improvement in pawl means of claim 1 wherein
    said two separae pawl members each comprise a generally planar body with a pair of laterally spaced ratchet engaging pawl teeth facing in one direction and a pair of laterally spaced end tabs extending endwise of said body and being located laterally outwardly of said pawl teeth and
    said resilient means includes a longitudinally extending pawl guide engaging laterally extending inner edge portions of each of said pawl members.

3. The improvement in pawl means of claim 1 or 2 wherein:
    said resilient means further includes spring means biasing one pawl member into engagement with one of said ratchets when the other pawl member engages the other of said ratchets.

4. The improvement in pawl means of claim 2 including the provision of planar spring means parallel to and extending adjacent the generally planar body of the two pawl members, said spring means being attached to one of the pawl members such that it biases the other pawl member.

5. The improvement in pawl means of claim 2 wherein said pawl guide includes portions extending between adjacent tab ends of both ends of said pawl member and said resilient means further includes a pair of bushing members of resilient material, each of said bushing members encircling two adjacent tab ends of said two pawl members and a portion of said pawl guide lying between said tab ends.

6. The improvement in pawl means of claim 1 further comprising:
    programming means independent of said split pawl means for engaging one pawl member of said split pawl means with one of said ratchets in a pre-determined lockup assured manner.

7. The improvement in pawl means of claim 6 wherein:
    said programming means includes a programming ratchet attached to a spool;
    a programming pawl selectively engaging said programming ratchet; and
    resilient connection means for connecting said split pawl means to said programming pawl whereby engagement of said programming pawl with said programming rachet in response to said sensor means causes said resilient connecting means to bias one pawl member to engage one of said spool locking ratchets in a pre-determined lockup assured manner.

8. A split pawl emergency locking means for a dual spool safety belt retractor having first and second belt storage spools, locking rachet wheel means on each spool, and a vehicle emergency condition sensor means comprising:
    a pair of separate pawl members;
    mounting means for mounting said pawl members to act as a unit between said spools in operable relation to the locking ratchet wheel means thereof whereby on operation of said sensor means said pawl members are moved as a unit into locking position relative said spool; and
    shock absorbing means between said pair of pawl members for maintaining each of said members in ratchet engaging position through a false locking condition.

9. The split pawl emergency locking means of claim 8 wherein:
    each of said separate pawl members is provided with a pair of ratchet engaging pawl teeth spaced along one lateral edge thereof and a generally planar portion along an opposite lateral edge thereof; and
    said shock absorbing means is provided so as to be extending along and in engagement with the opposing opposite lateral edges of said members.

10. The split pawl emergency locking means of claims 8 or 9 wherein said retractor has a frame with journal openings in spaced side walls thereof;

said separate pawl members each have opposite end portions extending into adjacent ones of said journal openings; and said shock absorbing means compfises the provision of resilient material for the full lateral extent of said members therebetween and between end portions of said members and portions of said retractor frame surrounding said journal openings.

* * * * *